(12) United States Patent
Kim

(10) Patent No.: US 12,174,060 B2
(45) Date of Patent: Dec. 24, 2024

(54) METHOD AND APPARATUS FOR SENSING IMPACT ON VEHICLE BASED ON ACOUSTIC SENSOR AND ACCELERATION SENSOR

(71) Applicant: THINKWARE CORPORATION, Gyeonggi-Do (KR)

(72) Inventor: Dae Won Kim, Gyeonggi-Do (KR)

(73) Assignee: THINKWARE CORPORATION (KR)

( * ) Notice: Subject to any disclaimer, the term of this patent is extended or adjusted under 35 U.S.C. 154(b) by 0 days.

(21) Appl. No.: 17/002,889

(22) Filed: Aug. 26, 2020

(65) Prior Publication Data

US 2020/0386612 A1    Dec. 10, 2020

Related U.S. Application Data

(63) Continuation of application No. 15/720,344, filed on Sep. 29, 2017, now Pat. No. 10,775,231.

(30) Foreign Application Priority Data

Sep. 30, 2016    (KR) ........................ 10-2016-0127097

(51) Int. Cl.
| | |
|---|---|
| *B60R 21/0132* | (2006.01) |
| *B60R 21/0136* | (2006.01) |
| *G01H 11/06* | (2006.01) |
| *G01N 19/08* | (2006.01) |
| *G01N 29/04* | (2006.01) |

(Continued)

(52) U.S. Cl.
CPC ......... *G01H 11/06* (2013.01); *B60R 21/0132* (2013.01); *B60R 21/0136* (2013.01); *G01N 19/08* (2013.01); *G01N 29/045* (2013.01); *G01N 29/11* (2013.01); *G01N 29/4436* (2013.01); *G01N 29/4445* (2013.01); *G06T 7/0002* (2013.01); *B60R 2021/01302* (2013.01); *G01N 2291/015* (2013.01)

(58) Field of Classification Search
CPC ....................................................... G01H 11/06
USPC .......................................................... 73/104
See application file for complete search history.

(56) References Cited

U.S. PATENT DOCUMENTS

| | | | | |
|---|---|---|---|---|
| 10,853,882 | B1 * | 12/2020 | Leise | ..................... G06V 20/46 |
| 2004/0135683 | A1 | 7/2004 | Sakai | |

(Continued)

FOREIGN PATENT DOCUMENTS

| | | |
|---|---|---|
| CN | 1482030 A | 3/2004 |
| JP | 2004062386 A | 2/2004 |

(Continued)

*Primary Examiner* — Walter L Lindsay, Jr.
*Assistant Examiner* — Philip T Fadul
(74) *Attorney, Agent, or Firm* — Hayes Soloway PC

(57) ABSTRACT

Disclosed herein are a method and apparatus for sensing an impact on a vehicle based on an acoustic sensor and an acceleration sensor. The method of sensing an impact on a vehicle may include obtaining information related to an impact sound generated in the vehicle of a user and around the vehicle of the user through an acoustic sensor, obtaining information related to an impact applied to the vehicle of the user through an impact detection sensor, and determining an impact sound directly generated in the vehicle of the user based on the information related to the impact sound and the information related to the impact.

11 Claims, 8 Drawing Sheets

(51) Int. Cl.
    *G01N 29/11*      (2006.01)
    *G01N 29/44*      (2006.01)
    *G06T 7/00*       (2017.01)
    *B60R 21/013*     (2006.01)

(56)          References Cited

U.S. PATENT DOCUMENTS

2009/0153312 A1    6/2009  Tanaka et al.
2016/0144817 A1*   5/2016  Chambers .............. G08G 1/205
                                                        340/436
2016/0295089 A1*  10/2016  Farahani ................ B60R 11/04
2017/0124788 A1*   5/2017  Nishida .............. G06K 9/00805

FOREIGN PATENT DOCUMENTS

KR     10-2005-0110113  A    11/2005
KR     10-2010-0056264  A     5/2010
KR        20140089817   A     7/2014
KR          101470163   B1   12/2014

* cited by examiner

METHOD AND APPARATUS FOR SENSING IMPACT ON VEHICLE BASED ON ACOUSTIC SENSOR AND ACCELERATION SENSOR

CROSS REFERENCE TO RELATED APPLICATION

The present application is a continuation of U.S. patent application Ser. No. 15/720,344 filed on Sep. 29, 2017 which claims the benefit of Korean Patent Application No. 10-2016-0127097 filed in the Korean Intellectual Property Office on Sep. 30, 2016, the entire contents of which are incorporated herein by reference.

BACKGROUND OF THE INVENTION

1. Technical Field

The following description relates to a technology for sensing an impact generated in the vehicle of a user and, more particularly, to a method and apparatus for sensing a minor impact generated in the vehicle of a user, such as door ding or a scratch.

2. Description of the Related Art

The spread of vehicles has been commercialized to the point of saying the present day to be a one-household one-vehicle era. It is obligatory to build a parking lot when a building is constructed due to an increase of vehicle. As described above, although a parking lot is obligatorily built, parking lots are far from enough compared to the number of vehicles. For this reason, vehicles are frequently parked in spaces other than parking lots, for example, roads in the surroundings of a building, alleys and the front of a shopping district area.

If a vehicle is parked in a designated outdoor parking space (e.g., a residential parking permit parking space) or an illegal parking space other than an underground parking space, a slight scratch or door-ding is frequently generated due to another vehicle (e.g., a motorcycle or a vehicle) that passes by around the vehicle, in particular, a motorcycle for delivery, the delivery basket of a motorcycle for delivery, a bicycle or a scooter.

Furthermore, although a vehicle is parked in a designated parking space (e.g., the space in which a parking stall line is indicated) of an underground parking space, a minor impact, such as door ding that a door of the vehicle of a user is indented in a process of opening or shutting the doors of vehicles parked on both sides of the parked vehicle of the user, is generated.

However, an existing image capturing device for a vehicle senses an impact generated in a vehicle using an acceleration sensor and records the sensed impact. In this case, however, a strong impact of specific sensitivity or more may be sensed, but it is difficult to sense a slightly generated impact, such as door ding or a scratch.

Furthermore, the acceleration sensor itself generates noise. It is difficult to distinguish between a sensed value and noise from the acceleration sensor and to determine whether a minor impact is generated in the vehicle of a user because the noise value and the sensing value of the minor impact, such as door ding or a scratch, are almost similar.

As described above, the existing image capturing device for a vehicle senses only impact greater than the noise of the acceleration sensor with low sensitivity. If the sensing sensitivity is lowered, it is difficult to sense a minor impact, such as door ding or a scratch having a size similar to noise. If the sensing sensitivity is raised, it is difficult to distinguish between noise and a minor impact.

Accordingly, there is a need for a technology for sensing a minor impact, such as door ding or a scratch generated in a vehicle. Korean Patent Application Publication No. 10-2010-0056264 discloses a method and apparatus, which sense impact generated outside a vehicle, check whether impact generation data is additionally generated within a specific time, consider that a chain-reaction collision or a collision was generated and provide the impact history of a vehicle that generates impact generation history data.

SUMMARY OF THE INVENTION

An object of the present invention is to provide a method and apparatus for sensing an impact on a vehicle, which sense a minor impact, such as door ding or a scratch generated in a parked vehicle using an acoustic sensor and an acceleration sensor at the same time, and record or store images of the outside and surroundings of a vehicle captured during a specific time from the time when an impact was sensed. As used herein, the term "image" may mean either or all of capturing visual data in a single frame, a collection of frames, and a video.

Another object of the present invention is to provide a method and apparatus for sensing an impact on a vehicle, which distinguish between a minor impact generated in a parked vehicle, noise itself from an acceleration sensor, and a sound generated in a facility around a vehicle or another vehicle using an acoustic sensor and an acceleration sensor at the same time.

A method of sensing an impact on a vehicle may include the steps of obtaining information related to an impact sound generated in the vehicle of a user and around the vehicle of the user through an acoustic sensor, obtaining information related to an impact applied to the vehicle of the user through an impact detection sensor, and determining an impact sound directly generated in the vehicle of the user based on the information related to the impact sound and the information related to the impact.

In accordance with one aspect, the step of determining the impact sound directly generated in the vehicle of the user may include determining peak values belonging to peak values included in the information related to the impact sound and corresponding to an area overlapped with peak values included in the information related to the impact based on a time axis to be information corresponding to the impact sound directly generated in the vehicle of the user.

In accordance with another aspect, the peak values included in the information related to the impact may be indicative of sensing values of impact reference sensitivity or more which have been predefined as sensing values corresponding to noise generated by the impact detection sensor.

In accordance with yet another aspect, the step of determining the impact sound directly generated in the vehicle of the user may include the steps of determining an area overlapped with peak values which belong to peak values included in the information related to the impact and which are included in the information related to the impact sound based on a time axis, and determining peak values belonging to the peak values included in the information related to the impact and corresponding to remaining areas other than the overlapped area to be self-noise generated in the impact detection sensor.

In accordance with further yet another aspect, the step of determining the impact sound directly generated in the vehicle of the user may include determining peak values, which belong to peak values belonging to the peak values included in the information related to the impact and corresponding to the overlapped area or peak values included in the information related to the impact and which do not include the self-noise, to be information corresponding to the impact sound directly generated in the vehicle of the user.

In accordance with further yet another aspect, the method may further include the steps of photographing the vehicle of the user and surroundings of the vehicle and recording an image belonging to captured images and captured for a specific time prior to a predefined reference time based on a point of time corresponding to the determined impact sound on a memory of an image capturing device when the impact sound directly generated in the vehicle of the user is determined.

In accordance with further yet another aspect, the step of recording the image captured for the specific time on the memory of the image capturing device may include the steps of compressing the image captured for the specific time, recording the compressed image on the memory of the image capturing device, and recording the compressed image on at least one of a storage device connected to a network and a user terminal.

In an embodiment of the present invention, a method of sensing an impact on a vehicle may include the steps of obtaining information related to an impact sound generated in the vehicle of a user and around the vehicle of the user through an acoustic sensor, obtaining information related to an impact applied to the vehicle of the user through an impact detection sensor, classifying the information related to the impact into a first impact applied to the vehicle of the user and a second impact applied to the vehicle of the user, determining an impact sound generated due to the second impact applied to the vehicle of the user based on the information related to the impact sound and information which belongs to the information related to the impact and which corresponds to the second impact, and recording an image captured in relation to the impact sound generated due to the second impact applied to the vehicle of the user.

In accordance with one aspect, the first impact may indicate a strong impact belonging to sensing values included in the information related to the impact and corresponding to sensing values of a predefined first reference value or more. The second impact may indicate a minor impact corresponding to a predefined second reference value or more with respect to sensing values belonging to the sensing values included in the information related to the impact and not including the sensing values of the first reference value or more.

In accordance with further yet another aspect, the step of determining the impact sound generated due to the second impact applied to the vehicle of the user may include determining sensing values belonging to sensing values included in the information corresponding to the second impact and corresponding to an area overlapped with peak values included in the information related to the impact sound based on a time axis to be sensing values related to the impact sound generated due to the second impact.

In accordance with further yet another aspect, the step of determining the impact sound generated due to the second impact applied to the vehicle of the user may include determining sensing values belonging to the sensing values included in the information corresponding to the second impact and corresponding to remaining areas other than the overlapped area to be self-noise generated in the impact detection sensor.

In an embodiment of the present invention, an apparatus for sensing an impact on a vehicle may include an acoustic sensor configured to sense an impact sound generated in the vehicle of a user and around the vehicle of the user and to generate information related to the sensed impact sound, an impact detection sensor configured to sense an impact applied to the vehicle of the user and to generate information related to the sensed impact, and a determination unit configured to determine an impact sound directly generated in the vehicle of the user based on the information related to the impact sound and the information related to the impact.

In accordance with one aspect, the determination unit may determine peak values belonging to peak values included in the information related to the impact sound and corresponding to an area overlapped with peak values included in the information related to the impact based on a time axis to be information corresponding to the impact sound directly generated in the vehicle of the user.

In accordance with further yet another aspect, the peak values included in the information related to the impact may be indicative of sensing values of impact reference sensitivity or more which have been predefined as sensing values corresponding to noise generated by the impact detection sensor.

In accordance with further yet another aspect, the determination unit may determine an area overlapped with peak values which belong to peak values included in the information related to the impact and which are included in the information related to the impact sound based on a time axis, and may determine peak values belonging to the peak values included in the information related to the impact and corresponding to remaining areas other than the overlapped area to be self-noise generated in the impact detection sensor.

In accordance with further yet another aspect, the determination unit may determine peak values, which belong to peak values belonging to the peak values included in the information related to the impact and corresponding to the overlapped area or peak values included in the information related to the impact and which do not include the self-noise, to be information corresponding to the impact sound directly generated in the vehicle of the user.

In accordance with further yet another aspect, the apparatus may further include a photographing unit configured to photograph the vehicle of the user and surroundings of the vehicle, and an image processing unit configured to record an image belonging to captured images and captured for a specific time prior to a predefined reference time based on a point of time corresponding to the determined impact sound on the memory of an image capturing device when the impact sound directly generated in the vehicle of the user is determined.

In an embodiment of the present invention, an apparatus for sensing an impact on a vehicle may include an acoustic sensor configured to sense an impact sound generated in the vehicle of a user and around the vehicle of the user and to generate information related to the sensed impact sound, an impact detection sensor configured to sense an impact applied to the vehicle of the user and to generate information related to the sensed impact, a determination unit configured to classify the information related to the impact into a first impact applied to the vehicle of the user and a second impact applied to the vehicle of the user and to determine an impact sound generated due to the second impact applied to the vehicle of the user based on the information related to the impact sound and information which belongs to the information related to the impact and which corresponds to the second impact, and an image processing unit configured to record an image captured in relation to the impact sound generated due to the second impact applied to the vehicle of the user.

In accordance with one aspect, the first impact may indicate a strong impact belonging to sensing values included in the information related to the impact and corresponding to sensing values of a predefined first reference value or more. The second impact may indicate a minor impact corresponding to a predefined second reference value or more with respect to sensing values belonging to the sensing values included in the information related to the impact and not including the sensing values of the first reference value or more.

In accordance with further yet another aspect, the determination unit may determine sensing values belonging to sensing values included in the information corresponding to the second impact and corresponding to an area overlapped with peak values included in the information related to the impact sound based on a time axis to be sensing values related to the impact sound generated due to the second impact.

DETAILED DESCRIPTION

Embodiments of the present invention are described in detail with reference to the accompanying drawings.

In an embodiment of the present invention, a minor impact, such as door ding or a scratch generated in a vehicle such as a car, van, delivery car or truck, is sensed, and an image captured in relation to the minor impact generated in the vehicle is recorded or stored. In particular, after a vehicle in which an image capturing device has been disposed is parked, a minor impact generated in the parked vehicle is sensed and recorded using an impact detection sensor and an acoustic sensor at the same time.

In the present embodiments, the impact detection sensor may include an acceleration sensor for sensing a great impact generated the outside of a vehicle, such as a vehicle collision. The acoustic sensor may include a microphone (mic) for sensing and receiving a sound (i.e., an audio signal) generated in a vehicle and around the vehicle.

In the present embodiments, an apparatus for sensing an impact on a vehicle is an electronic device disposed within the vehicle of a user and may be an image capturing device for a vehicle, for example. In this case, the image capturing device for a vehicle may include the microphone (i.e., the microphone and the image capturing device or a vehicle may be integrally fabricated), and the microphone may be implemented to be mounted on a vehicle separately from the image capturing device. For example, if a wireless microphone is mounted on the door handle, side mirror, etc. of a vehicle separately from an image capturing device within a vehicle, the image capturing device may receive information related to an impact sound sensed by the wireless microphone from the wireless microphone and analyze the received information related to the impact sound.

Figure 1:
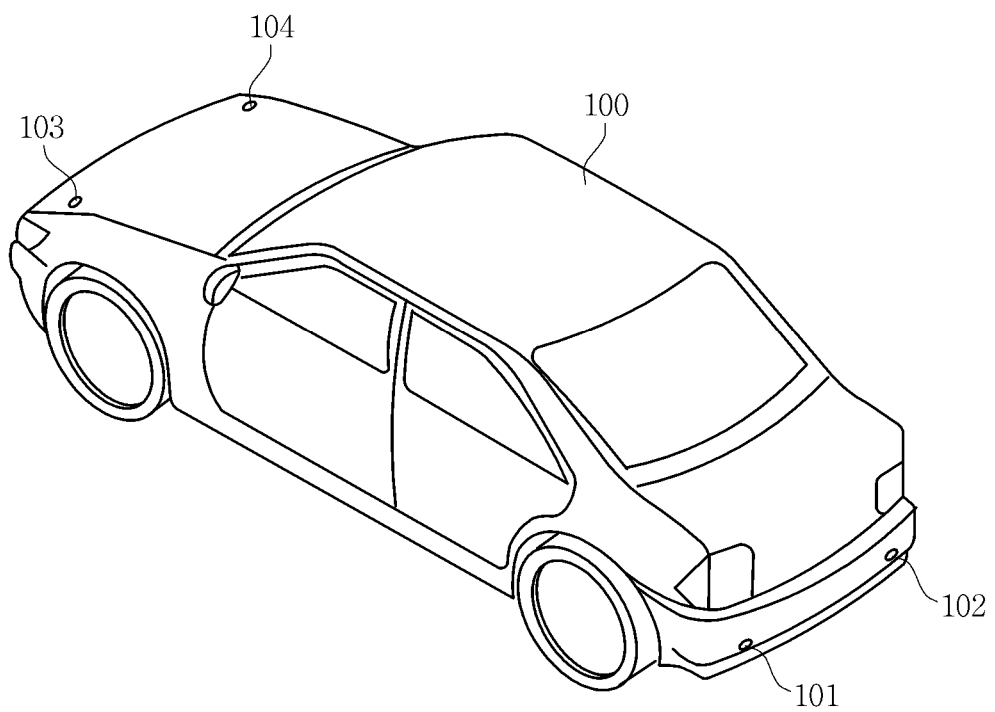
FIG. 1 is a diagram showing a vehicle including an apparatus for sensing an impact on a vehicle in accordance with an embodiment of the present invention.

FIG. 1 is a diagram showing a vehicle including an apparatus for sensing an impact on a vehicle in accordance with an embodiment of the present invention.

Referring to FIG. 1, the apparatus for sensing an impact on a vehicle may be disposed within a vehicle 100. For example, a photographing unit such as a camera for photographing the outside of the vehicle and the surroundings of the vehicle, a determination unit for analyzing a captured image, and memory for storing the captured image may be disposed within the vehicle 100. For example, the apparatus for sensing an impact on a vehicle may be disposed in an area in the periphery of a windshield, a room mirror, etc. within the vehicle 100.

An impact detection sensor for sensing an impact of specific pressure applied to the vehicle may be disposed at the outside of the vehicle 100 and may be integrated with the apparatus for sensing an impact on a vehicle and disposed within the vehicle 100.

For example, if the impact detection sensor (e.g., an acceleration sensor) is disposed within the vehicle in an integrated form, it may sense a dynamic force attributable to the shaking of the impact detection sensor, such as an image capturing device disposed within the vehicle, as an impact is applied to the vehicle.

For another example, if the impact detection sensor is disposed at the outside of the vehicle 100, a plurality of acceleration sensors 101, 102, 103 and 104 may be disposed at the front and rear of the vehicle 100 in order to sense an impact applied to the front part or rear part of the vehicle. In order to sense pressure applied to a door of the vehicle 100, such as door ding, a plurality of the acceleration sensors may be disposed in the driver's seat and passenger seat doors and back seat doors on both sides of the vehicle 100.

An acoustic sensor is disposed within the vehicle and may be implemented to be integrated with the apparatus for sensing an impact on the vehicle, that is, an image capturing device, and may be disposed at the outside of the vehicle or in an area in the periphery of a door within the vehicle in order to sense a minor impact, such as door ding generated from a door of the vehicle.

Figure 2:
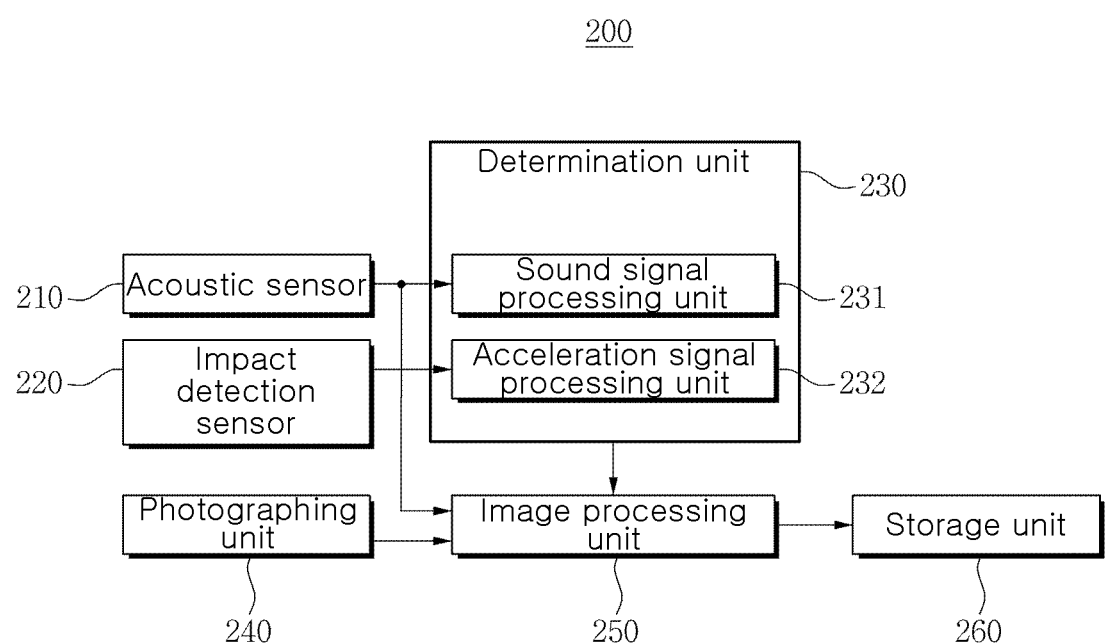
FIG. 2 is a block diagram showing the internal configuration of the apparatus for sensing an impact on a vehicle in accordance with an embodiment of the present invention.
Figure 3:
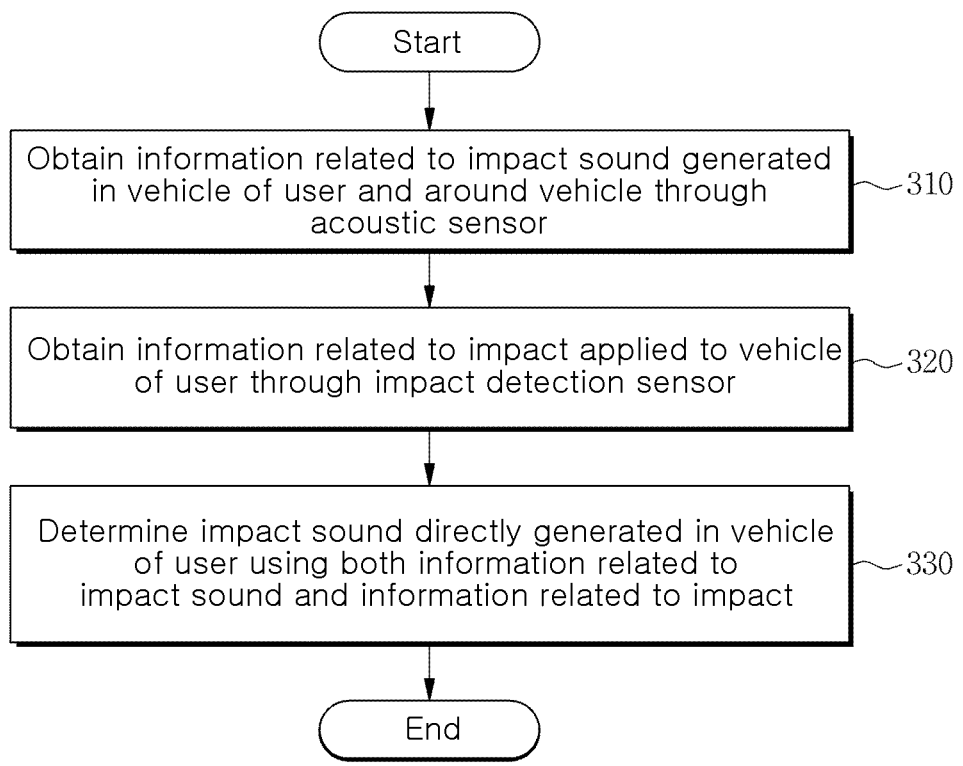
FIG. 3 is a flowchart illustrating a method of sensing an impact on a vehicle in accordance with an embodiment of the present invention.

FIG. 2 is a block diagram showing the internal configuration of the apparatus for sensing an impact on the vehicle in accordance with an embodiment of the present invention, and FIG. 3 is a flowchart illustrating a method of sensing an impact on the vehicle in accordance with an embodiment of the present invention.

Referring to FIG. 2, the apparatus 200 for sensing an impact on a vehicle may include an acoustic sensor 210, an impact detection sensor 220, a determination unit 230, a photographing unit 240, an image processing unit 250 and a storage unit 260. In this case, the determination unit 230 may include a sound signal processing unit 231 and an acceleration signal processing unit 232. Furthermore, the apparatus for sensing an impact on the vehicle 100 may further include a display unit (not shown) for displaying a captured or recorded image by playing back the image. The elements of the apparatus 200 for sensing an impact on a vehicle shown in FIG. 2, that is, the acoustic sensor 210, the impact detection sensor 220, the determination unit 230, the photographing unit 240, the image processing unit 250 and the storage unit 260 may perform the steps 310 to 330 of a method of sensing an impact on the vehicle included in FIG. 3. In this case, the operations of the photographing unit 240, the image processing unit 250 and the storage unit 260 are described later with reference to FIG. 6.

At step 310, the acoustic sensor 210 may generate information related to an impact sound by sensing the impact sound generated in the vehicle 100 of a user and around the vehicle 100. Accordingly, the sound signal processing unit 231 may obtain the information related to the impact sound from the acoustic sensor 210.

For example, after the vehicle 100 of a user is parked, a minor impact, such as door ding or a scratch, may be generated in the parked vehicle 100 or a strong impact, such as a collision between the vehicle 100 of the user and another vehicle, may be generated. The acoustic sensor 210 may sense a direct minor impact on the vehicle 100 of the user and an impact sound generated when a strong impact is applied to the vehicle. For example, the impact sound may be received through a microphone. The microphone may generate information related to the impact sound in an analyzable form by digitizing the received impact sound.

In this case, the acoustic sensor 210 may also sense a sound in a construction site near the vehicle 100 or a sound generated in another vehicle that passes by the parked vehicle 100 in addition to a direct impact on the vehicle 100 of the user. For example, the acoustic sensor 210 may sense a sound generated when a door of another vehicle beside the parked vehicle 100 is open or shut, a Klaxon sound and the voice of people who talk around the vehicle 100 of the user.

At step 320, the impact detection sensor 220 may sense an impact generated as specific pressure is applied to the outside of the vehicle 100 of the user and generate information related to the sensed impact. Accordingly, the acceleration signal processing unit 232 may obtain the information related to the impact from the impact detection sensor 220.

For example, the impact detection sensor 220, such as an acceleration sensor, may sense a dynamic force, such as an impact, vibration, acceleration and gravity acceleration applied to the vehicle 100 of the user with specific pressure. For example, the impact detection sensor 220 may sense an impact, such as door ding or a scratch applied to the vehicle 100 of the user with weak pressure, and an impact attributable to a collision with a shopping cart and may sense a collision against another vehicle which is applied with strong pressure.

At step 330, the determination unit 230 may determine an impact sound directly generated in the vehicle of the user using both the information related to the impact sound, obtained by the acoustic sensor 210, and the information related to the impact, obtained by the impact detection sensor 220 at the same time. That is, the impact sound corresponding to a minor impact, such as door ding or a scratch actually generated in the vehicle of the user may be determined.

For example, the determination unit 230 may distinguish between a sound signal generated by an object, such as a building, a person or another vehicle located around the vehicle of a user, and an impact sound generated as an impact is directly applied to the vehicle of the user using information related to an impact, which belongs to information related to an impact sound sensed through a microphone. Furthermore, the determination unit 230 may selectively recognize only the impact sound, generated in the vehicle of the user, in the information related to the impact sound. A detailed operation of selectively recognizing only the impact sound generated in the vehicle of the user is described later with reference to FIG. 4.

For another example, the determination unit 230 may distinguish between a minor impact, such as door ding or a scratch directly applied to the vehicle of the user, and noise generated within the vehicle in the sensing process of the acceleration sensor using information related to an impact sound which belongs to information related to related to an impact sensed through the acceleration sensor. Furthermore, the determination unit 230 may recognize the minor impact directly generated in the vehicle of the user by excluding the noise from the information related to the impact. A detailed operation of determining the minor impact generated in the vehicle of the user by distinguishing between the information related to the impact and the noise is described later with reference to FIGS. 4 and 5.

Figure 4:
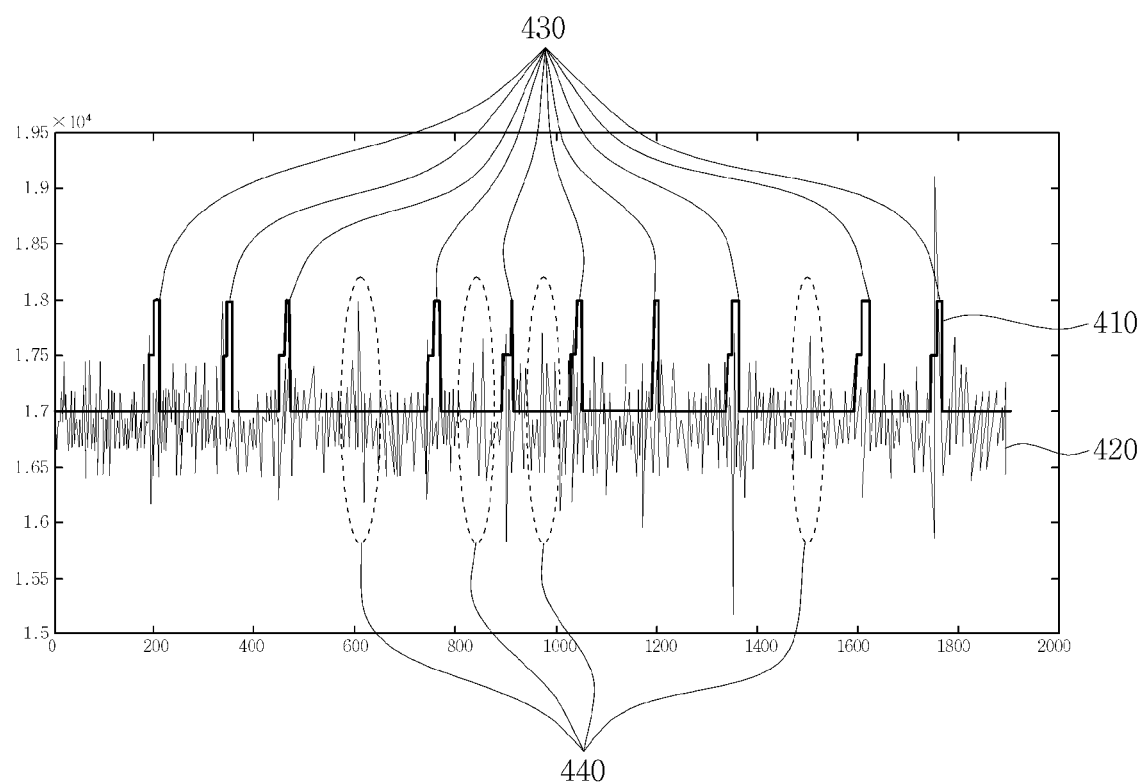
FIG. 4 is a graph showing information related to an impact sound and information related to an impact that are sensed by an acoustic sensor and an impact detection sensor in accordance with an embodiment of the present invention.

FIG. 4 is a graph showing information related to an impact sound and information related to an impact that are sensed by an acoustic sensor and an impact detection sensor in accordance with an embodiment of the present invention.

FIG. 4 illustrates a graph 410 showing impact sound-related information according to an impact sound sensed by the acoustic sensor 210 and a graph 420 showing impact-related information according to an impact sensed by the impact detection sensor 220 when a door ding impact is generated in a door of the vehicle of a user ten times for a specific time.

Referring to FIG. 4, a traverse axis may denote time, and a longitudinal axis may denote a sensing value obtained by digitizing an impact sound or an impact (i.e., a dynamic force applied to the vehicle). In FIG. 4, an operation of determining a minor impact applied to the vehicle based on information related to an impact sound sensed by a microphone, that is, the acoustic sensor, is described below.

From FIG. 4, it may be seen that sensing values included in the impact sound-related information include ten peak values 430. The peak values 430 may indicate sensing values corresponding to a reference value or more which has been defined in relation to an impact sound. Furthermore, the determination unit 230 may determine information corresponding to a minor impact sound directly generated in the vehicle of the user, which belongs to the impact sound-related information, using peak values included in the impact-related information with respect to the peak values 430 included in the impact sound-related information.

For example, the determination unit 230 may determine peak values, corresponding to an area that overlaps the peak values included in the impact-related information based on the time axis, as information corresponding to an impact sound directly generated in the vehicle of the user with respect to the peak values 430 included in the impact sound-related information. Referring to FIG. 4, all the ten peak values 430 may be determined to be information related to a minor impact generated in the vehicle of the user because they overlap the peak values included in the impact-related information. In this case, the peak values included in the impact-related information may indicate sensing values of impact reference sensitivity or more (e.g., corresponding to a second reference value of FIG. 8) predefined as sensing values corresponding to noise generated by the impact detection sensor 220. For example, the impact reference sensitivity may be previously defined as an average value of self-noise measured by the impact detection sensor 220 for a predefined specific time. The determination unit 230 may determine whether a minor impact has occurred in the vehicle using peak values that belong to the sensing values included in the impact-related information and that correspond to the impact reference sensitivity or more, that is, the sensing value of the self-noise of the acceleration sensor and the peak values 430 included in the impact sound-related information at the same time.

In this case, in order to determine whether a minor impact has occurred using the impact sound-related information and the impact-related information at the same time, the acoustic sensor 210 and the impact detection sensor 220 may perform time synchronization. Furthermore, the determination unit 230 may determine a point of time at which both the acoustic sensor 210 sensed the impact sound and the impact detection sensor 220 sensed the impact as a point of time at which the minor impact was generated in the vehicle of the user using the impact sound-related information and the impact-related information obtained from the acoustic sensor 210 and the impact detection sensor 220 that have been time-synchronized at the same time based on the time axis.

Figure 5:
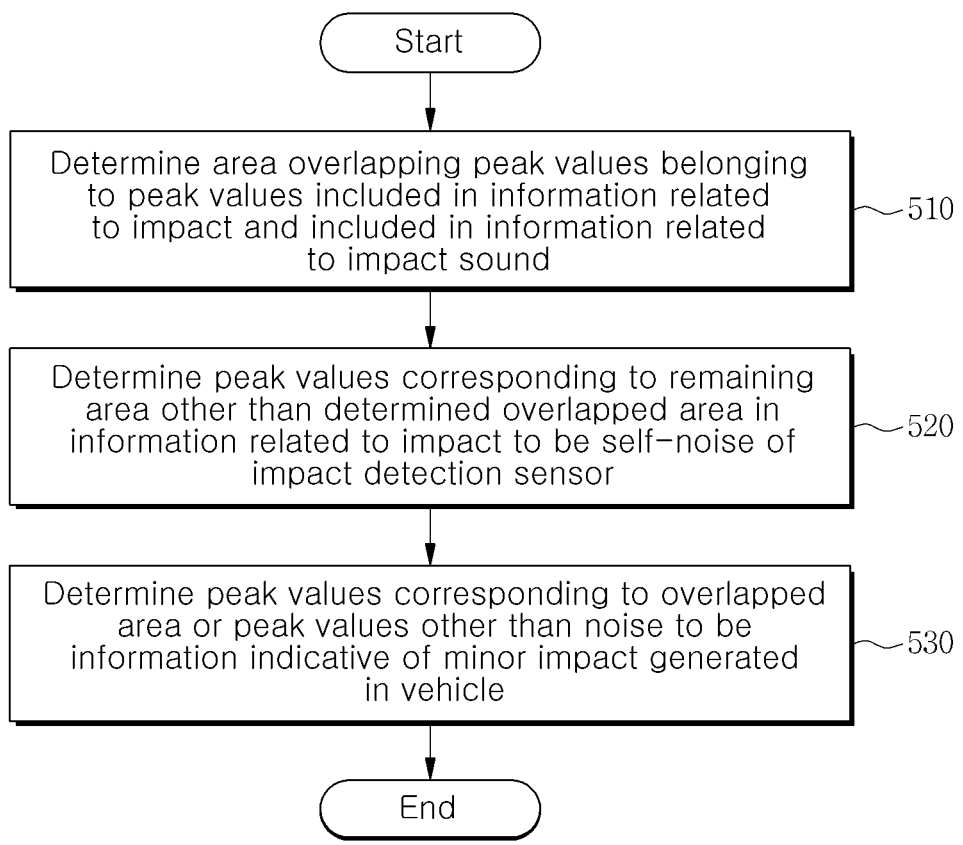
FIG. 5 is a flowchart illustrating an operation of distinguishing between the self-noise of the impact detection sensor and a minor impact applied to the vehicle of a user in accordance with an embodiment of the present invention.

FIG. 5 is a flowchart illustrating an operation of distinguishing between the self-noise of the impact detection sensor and a minor impact applied to the vehicle of a user in accordance with an embodiment of the present invention.

Steps 510 to 530 of FIG. 5 may be performed by the determination unit 230 of FIG. 2. An operation of determining a minor impact applied to the vehicle based on information related to an impact sensed by the acceleration sensor, that is, the impact detection sensor, is described below with reference to FIG. 5.

At step 510, the determination unit 230 may determine an area overlapped with peak values that belong to peak values included in information related to an impact and that are included in information related to an impact sound.

For example, referring to FIG. 4, the determination unit 230 may determine an area overlapping the ten peak values 430 that belong to fourteen peak values included in information related to an impact and that are included in information related to an impact sound.

At step 520, the determination unit 230 may determine peak values 440, corresponding to the remaining area other than the determined overlapped area in the information related to the impact, to be the self-noise of the impact detection sensor 220.

At step 530, the determination unit 230 may determine peak values that belong to the peak values (e.g., the fourteen peak values of FIG. 4) included in the information related to the impact and that correspond to the overlapped area, that is, peak values overlapping the ten peak values 430 to be information indicative of a minor impact generated in the vehicle of the user. Alternatively, the determination unit 230 may determine peak values that belong to the peak values (e.g., the fourteen peak values of FIG. 4) included in the information related to the impact and that do not include the peak values 440 corresponding to noise as information indicative of a minor impact.

At step 510, the determination unit 230 may determine an area not overlapped with peak values that belong to peak values included in information related to an impact and that are included in information related to an impact sound. For example, referring to FIG. 4, the determination unit 230 may determine an area not overlapping the ten peak values 430 that belong to the fourteen peak values included in the information related to the impact and that are included in the information related to the impact sound. Furthermore, the determination unit 230 may determine the four peak values 440 corresponding to the non-overlapped area to be noise. When the noise is determined as described above, the determination unit 230 may determine peak values corresponding to a minor impact, such as door ding or a scratch directly applied to the vehicle of the user, by excluding the noise from the information related to the impact, and may determine a point of time at which the determined peak values was generated to be a point of time at which the minor impact was generated.

Accordingly, the determination unit 230 may provide the image processing unit 250 with time point information indicative of the point of time at which the minor impact was generated in the vehicle of the user. The image processing unit 250 may record or store an image, captured in relation to the minor impact generated in the vehicle of the user based on the time point information, in the storage unit 260. That is, an image captured in relation to the minor impact applied to the vehicle of the user may be recorded on the memory (e.g., an SD memory card or a micro memory card) of the image capturing device.

Figure 6:
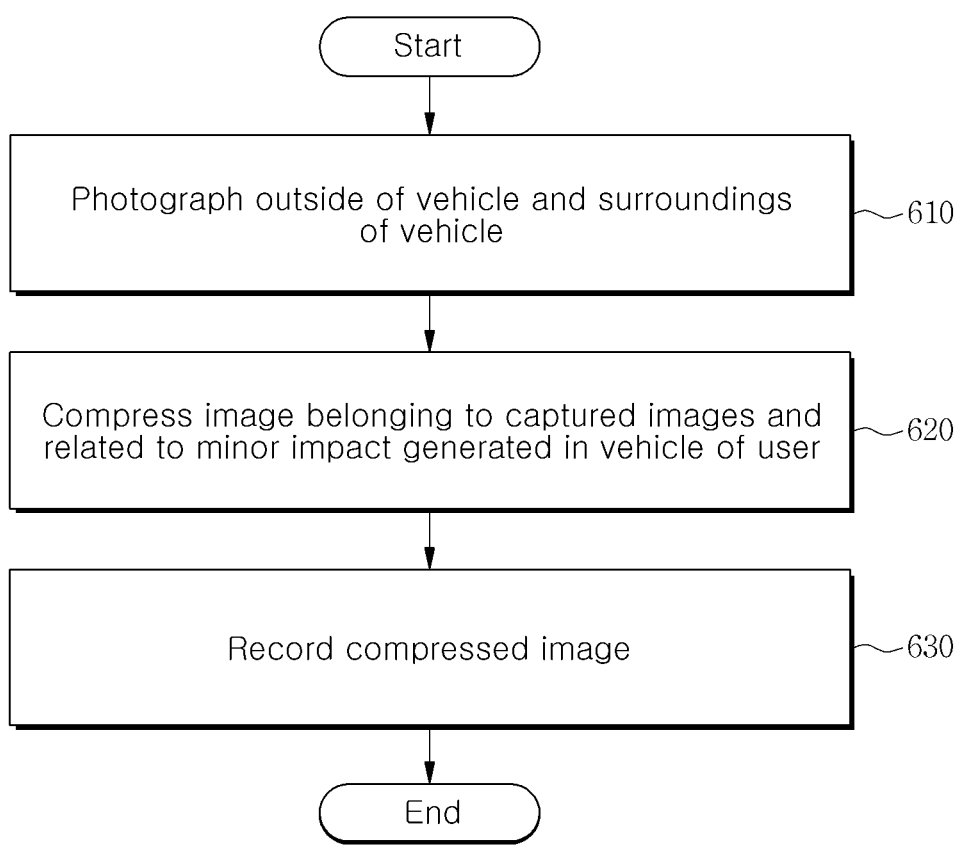
FIG. 6 is a flowchart illustrating an operation of recording or storing an image in relation to a minor impact generated in the vehicle of a user in accordance with an embodiment of the present invention.

FIG. 6 is a flowchart illustrating an operation of recording or storing an image in relation to a minor impact generated in the vehicle of a user in accordance with an embodiment of the present invention.

Steps 610 to 630 of FIG. 6 may be performed by the photographing unit 240, the image processing unit 250 and the storage unit 260 of FIG. 2.

At step 610, the photographing unit 240 may photograph the outside of the vehicle and the surroundings of the vehicle.

For example, the photographing unit 240 may photograph the vehicle of a user that is being driven, the outside of the parked vehicle of a user, and the surroundings of the vehicle. For example, the photographing unit 240 includes a camera and may photograph an object (e.g., another vehicle or a person) that approaches the vehicle of the user, other vehicles around the vehicle of the user, and facilities (e.g., buildings, streetlamps or trees) around the vehicle of the user through the camera disposed within the vehicle. Furthermore, the photographing unit 240 may transfer the captured images to the image processing unit 250.

At step 620, the image processing unit 250 may compress an image that belongs to the captured images and that is related to a minor impact generated in the vehicle of the user based on time point information provided by the determination unit 230. In this case, the image processing unit 250 may compress the captured image and impact sound-related information received from the acoustic sensor 210 together. That is, audio and an image may be synchronized and compressed together.

For example, as in the acoustic sensor 210 and the impact detection sensor 220, time synchronization may be set in the photographing unit 230. Accordingly, the image processing unit 250 may compress images that belong to the images captured by the photographing unit 230 and that correspond to the time point information. In this case, the image processing unit 250 may compress images for a specific time, which have been captured prior to a predefined reference time based on a point of time at which a minor impact was generated. For example, when a minor impact was generated at 8 a.m., the image processing unit 250 may compress images captured for five minutes from 7:59, that is, slightly prior to 8 a.m. when the impact was generated, to 8:04.

In addition, the image processing unit 250 may compress all of captured images depending on setting. For example, if a user has performed setting so that all of images captured by the photographing unit 230 are recorded, the image processing unit 250 may compress all of captured images for each predefined time unit. Furthermore, if setting has been performed so that all of images are recorded only in a parking mode, the image processing unit 250 does not compress an image captured while driving and may compress only an image captured while the vehicle is parked. Furthermore, if setting has been performed so that an image is recorded only when an impact was generated in the vehicle, the image processing unit 250 may compress only images that belong to images captured while the vehicle is driving and while the vehicle is parked and that are related to points of time at which a strong impact (e.g., a vehicle collision) and a minor impact (e.g., door ding or a scratch) are generated.

In this case, the image processing unit 250 may differently apply an image compression ratio depending on setting. For example, if a user has performed setting so that all of images captured by the photographing unit 230 are recorded, the image processing unit 250 may compress images captured in relation to a point of time at which an impact including a strong impact and minor impact is generated at a compression ratio lower than that of images captured if an impact is not generated. That is, in order to provide an image of high picture quality when a vehicle collision or accident is generated, an image captured in relation to a point of time at which an impact is generated may be compressed at a predefined low compression ratio, and an image at normal times while an impact is not generated may be compressed at a high compression ratio in order to store many images although picture quality is low.

For example, according to an embodiment of the present invention, the image processing unit 250 may apply a different compression ratio by controlling resolution, frame rate, quantization parameter (QP), group of pictures (GOP), etc. of a captured image.

Furthermore, if setting has been performed so that an image is recorded only when an impact is generated in the vehicle, the image processing unit 250 may compress an image related to a point of time at which a strong impact (e.g., a vehicle collision) is generated at a compression ratio lower than that of an image related to a minor impact so that the image related to the point of time at which the strong impact is generated is provided with high picture quality, and may compress images related to a point of time at which a minor impact (e.g., door ding or a scratch) is generated at a compression ratio higher than that of an image related to a strong impact. The image processing unit 250 may compress images related to both a strong impact and a minor impact at a predefined high compression ratio or low compression ratio depending on setting.

Furthermore, the image processing unit 250 of the apparatus 200 for sensing an impact on a vehicle may divide and store a storage region logically or physically depending on the degree of an impact applied to the vehicle. For example, the image processing unit 250 may store image data related to a point of time at which a strong impact (e.g., a vehicle collision) is generated and image data related to a minor impact in different folders.

In another embodiment, if the storage unit 260 is configured to include an internal storage medium, such as a hard disk or flash memory, and a detachable storage medium attachable to or detachable from the apparatus 200 for sensing an impact on a vehicle, such as an SD card, a micro SD card or USB memory, the image processing unit 250 may store image data related to a point of time at which a strong impact (e.g., a vehicle collision) is generated and image data related to a minor impact in different storage media. For example, the image data related to the point of time at which the strong impact (e.g., a vehicle collision) is generated may be stored in the internal storage medium, and the image data related to the minor impact may be stored in the detachable storage medium.

At step 630, the image processing unit 250 may record or store the compressed image in the storage unit 260. For example, the image processing unit 250 may record or store images, compressed in relation to a minor impact generated in the vehicle of the user, in the memory card of the image capturing device.

In this case, if the memory space is insufficient, previously stored data may be sequentially deleted in order of earlier time and newly compressed data may be stored. If an image (i.e., a recorded image) stored in relation to an impact, that is, a strong impact or a minor impact generated in relation to the vehicle of a user, is deleted, a difficult situation may occur. For example, although a long time has elapsed after an image was stored in the memory, if the corresponding image is an important image related to a minor impact applied to the vehicle of a user or an accident, it needs to continue to be stored. Accordingly, the apparatus 200 for sensing an impact on a vehicle may provide a compressed image to a storage device connected to a previously registered network or a user terminal (e.g., a smartphone or tablet PC) owned by a user. The apparatus 200 for sensing an impact on a vehicle may include a wireless communication module (not shown), such as Wi-Fi or Bluetooth, or a wired communication module using the RS-232 or USB communication method in order to provide the compressed image to the storage device connected to the network or the user terminal. In this case, the storage device connected to the network may include various media, such as Cloud, a server provided by an Internet portal service company such as GOOGLE, DAUM or NAVER with which the e-mail account of the user has been registered, a web hard, or network attached storage (NAS), which are connected to a network and are capable of storing user data. Accordingly, the apparatus 200 for sensing an impact on a vehicle may transmit a compressed image to the storage device connected to the network through the wireless communication module or wired communication module (not shown).

For example, the apparatus 200 for sensing an impact on a vehicle may back up an image, compressed in relation to an impact generated in the vehicle, in the storage device connected to a network previously registered by a user when or after the image capturing device is installed while operating in conjunction with a web server (e.g., DAUM, NAVER, GOOGLE or YAHOO).

For another example, the apparatus 200 for sensing an impact on a vehicle may provide a user terminal with notification providing notification that an impact was generated in the vehicle, while operating in conjunction with the server of a communication company to which the user terminal belongs. An operation of providing the user terminal with an image compressed in relation to an impact is described below with reference to FIG. 7.

Figure 7:
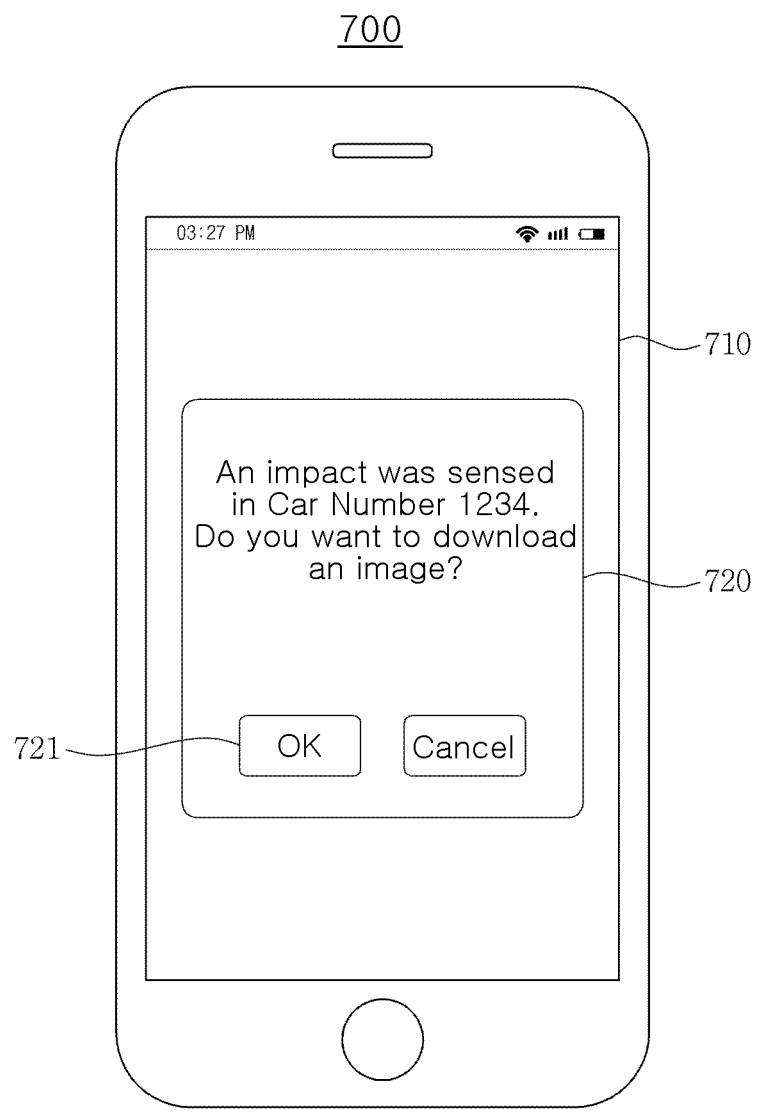
FIG. 7 is a diagram showing a screen of a user terminal on which notification providing notification of an impact generated in the vehicle of a user is display in accordance with an embodiment of the present invention.

FIG. 7 is a diagram showing a screen of a user terminal on which notification providing notification of an impact generated in the vehicle of a user is display in accordance with an embodiment of the present invention.

When a minor impact or strong impact is generated in the vehicle of a user, an image captured in relation to the impact may be compressed and stored in the storage unit 260, that is, the memory of the image capturing device. Furthermore, the apparatus 200 for sensing an impact on a vehicle may transmit notification or a text message, providing notification that the impact was generated, to the user terminal 700 while operating in conjunction with the server of a communication service company to which the user terminal 700 belongs in order to provide the compressed image to the user terminal 700. Accordingly, notification 720 may be displayed on the screen 710 of the user terminal 700.

In this case, when display information 710 indicative of "Yes" is selected, the compressed image may be downloaded onto the user terminal 700 and stored therein. Although an image compressed in relation to a minor impact or strong impact on the vehicle is not downloaded, a user can directly move to the place where his or her vehicle has been parked and check whether abnormality has occurred in the vehicle because the notification is provided.

Figure 8:
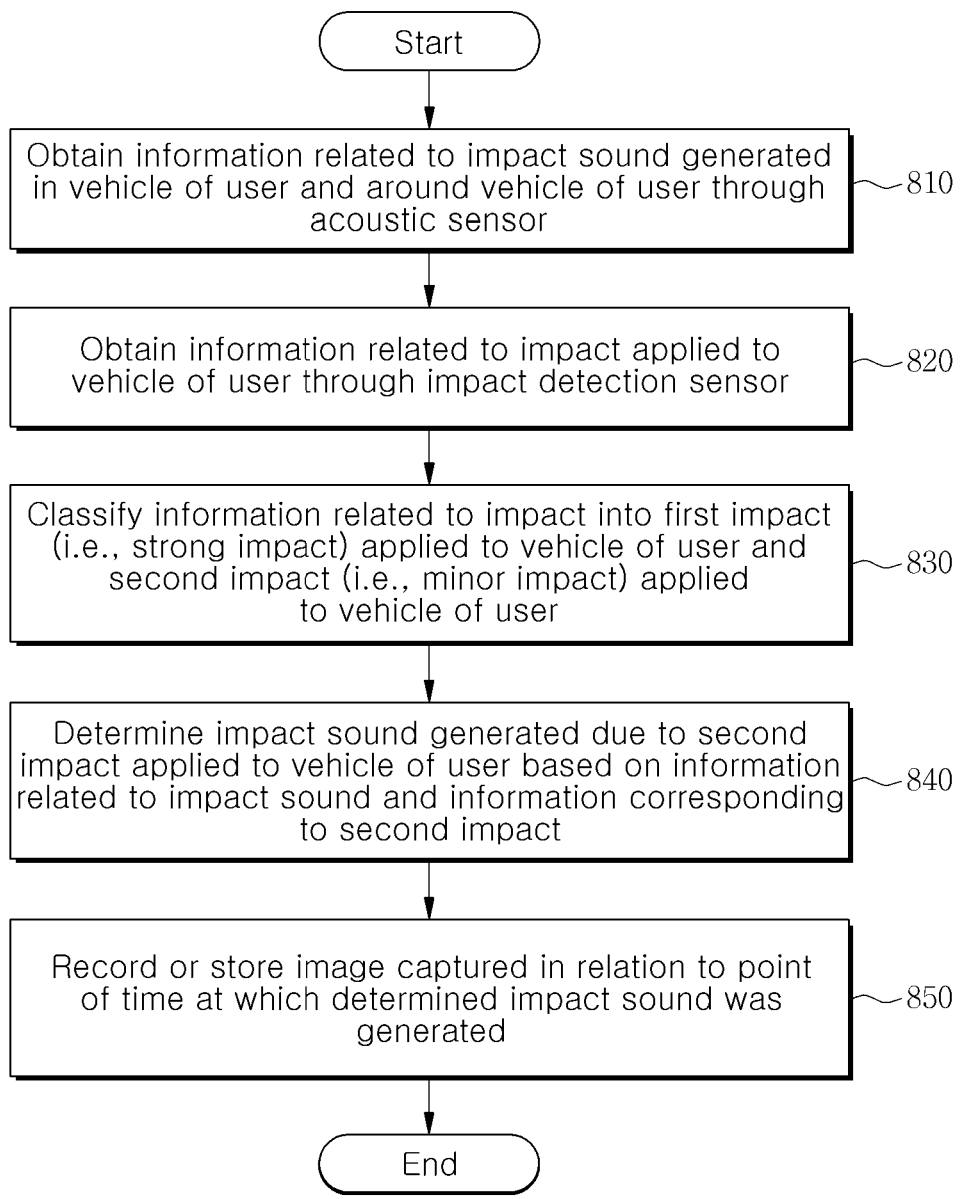
FIG. 8 is a flowchart provided in order to describe an operation of distinguishing between a strong impact applied to the vehicle and a minor impact applied to the vehicle using both the impact detection sensor and the acoustic sensor in accordance with an embodiment of the present invention.

FIG. 8 is a flowchart provided in order to describe an operation of distinguishing between a strong impact applied to the vehicle and a minor impact applied to the vehicle using both the impact detection sensor and the acoustic sensor in accordance with an embodiment of the present invention.

Steps 810 to 850 of FIG. 8 may be performed by the elements of the apparatus 200 for sensing an impact on a vehicle in FIG. 2, that is, the acoustic sensor 210, the impact detection sensor 220, the determination unit 230, the photographing unit 240, the image processing unit 250 and the storage unit 260.

At step 810, when the acoustic sensor 210 senses an impact sound generated at the outside of the vehicle of a user and around the vehicle and generates information related to the sensed impact sound, the determination unit 230 may obtain the information related to the impact sound from the acoustic sensor 210.

At step 820, when the impact detection sensor 220 senses an impact applied to the vehicle of the user and generates information related to the sensed impact, the determination unit 230 may obtain the information related to the impact from the impact detection sensor 220.

For example, the impact detection sensor 220 may sense a collision between the vehicle of a user and another vehicle, a strong impact applied to the vehicle of a user due to a post in a parking lot, a telephone pole, a clothes collection box or discarded furniture while the vehicle is parked, door ding or a scratch applied when a door of a vehicle next to the parked vehicle of a user is open, or a minor impact applied to the vehicle of a user due to an object (e.g., another vehicle or a bicycle) that passes by the vehicle of a user.

At step 830, the determination unit 230 may classify the information related to the impact obtained from the impact detection sensor 220 into a strong impact (i.e., first impact) applied to the vehicle of the user and a minor impact (i.e., a second impact) applied to the vehicle of the user using the information related to the impact sound which has been obtained from the acoustic sensor 210.

For example, the determination unit 230 may determine sensing values that belong to sensing values included in information related to an impact and that have a predefined first reference value or more. That is, the determination unit 230 may determine sensing values that belong to the sensing values included in the information related to the impact and that correspond to a strong impact. Furthermore, the determination unit 230 may exclude the determined sensing values included in the information related to the impact and that have the predefined first reference value or more, and may determine sensing values that belongs to the excluded sensing values and that have a predefined second reference value or more. That is, the determination unit 230 may determine sensing values corresponding to a minor impact by excluding the sensing values that belong to the sensing values included in the information related to the impact and that correspond to the strong impact and determining the sensing values that belong to the excluded sensing values and that have the second reference value or more.

In this case, the first reference value is a value predefined to sense a strong impact applied to the vehicle of a user, and the second reference value is a value predefined to sense a minor impact applied to the vehicle of a user. The first reference value may be previously defined to be greater than the second reference value. For example, the second reference value may be previously defined as an average value of sensing values corresponding to noise measured for a specific time because a minor impact applied to the vehicle of a user and noise generated in the acceleration sensor itself have almost the same sensing value (i.e., size). Furthermore, the first reference value may be previously defined to be a value obtained by adding a (i.e., a predefined constant) to the second reference value so that the noise is fully removed.

At step 840, the determination unit 230 may determine an impact sound generated due to the minor impact applied to the vehicle of the user based on the impact sound-related information obtained from the acoustic sensor 210 the information corresponding to the minor impact (i.e., the second impact).

For example, referring to FIG. 4, the determination unit 230 may determine peak values that belong to the peak values 430 included in the information related to the impact sound and that correspond to an area overlapping with peak values included in information corresponding to a minor impact, to be peak values corresponding to the minor impact actually applied to the vehicle of the user. Furthermore, the determination unit 230 may determine the peak values 440 that belong to the peak values included in the information corresponding to the minor impact and that correspond to the remaining areas other than the area overlapped with the peak values 430 to be the self-noise of the acceleration sensor. When the noise is determined as described above, the determination unit 230 may determine the peak values corresponding to the minor impact actually applied to the vehicle of the user by excluding the peak values corresponding to the noise from the peak values included in the information corresponding to the minor impact.

As described above, the determination unit 230 may determine an impact sound corresponding to a minor impact actually applied to the vehicle of a user using information corresponding to the minor impact based on information related to the impact sound, and may determine the minor impact actually applied to the vehicle of the user using the information related to the impact sound based on the information corresponding to the minor impact. Furthermore, the determination unit 230 may determine a point of time at which the determined impact sound or minor impact was generated (i.e., a point of time at which a peak value corresponding to the determined impact sound is sensed or a point of time at which a peak value corresponding to the minor impact is sensed) to be a point of time at which the minor impact actually applied to the vehicle of the user was generated. Furthermore, the determination unit 230 may transfer time point information indicative of the determined point of time to the image processing unit 250.

In addition, the determination unit 230 may extract information corresponding to a strong impact from information included in the information related to the impact. Furthermore, the determination unit 230 may transfer time point information indicative of a point of time at which the information corresponding to the strong impact (e.g., peak values) was generated to the image processing unit 250.

At step 850, the image processing unit 250 may record or store an image, captured in relation to the point of time at which the minor impact or the impact sound corresponding to the minor impact was actually generated in the vehicle of the user based on the time point information, in the storage unit 260.

For example, the image processing unit 250 may compress an image captured for a specific time prior to the point of time at which the minor impact was generated in the vehicle of the user and information related to an impact sound that corresponds to the specific time and that has been received from the acoustic sensor 210 (i.e., an audio signal from a point of time prior to the point of time at which the minor impact was generated to a point of time posterior to the point of time at which the minor impact was generated in relation to the minor impact) at a specific compression ratio. Furthermore, the image processing unit 250 may record or store the compressed image in the storage unit 260.

In this case, when time point information corresponding to a strong impact is received, the image processing unit 250 may compress an image captured for a specific time before a point of time at which the strong impact was generated in the vehicle of the user and information related to an impact sound that corresponds to the specific time and that has been received from the acoustic sensor 210 (i.e., an audio signal from a point of time prior to the point of time at which the strong impact was generated to a point of time posterior to the point of time at which the strong impact was generated in relation to the strong impact) at a specific compression ratio based on the time point information. In this case, the compression ratio of an image related to the strong impact and the compression ratio of an image related to the minor impact may be the same or different. For example, if the compression ratios are different, in order to provide the image related to the strong impact of high picture quality compared to the image related to the minor impact, a compression ratio lower than that of the image related to the minor impact may be used in the image related to the strong impact. In this case, an operation of compressing the image and recording or storing the compressed image has been described above with reference to FIG. 6, and a redundant description thereof is omitted.

The apparatus described above may be implemented in the form of a combination of hardware components, software components, and/or hardware components and software components. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter.

A minor impact, such as door ding or a scratch generated in a parked vehicle, the self-noise of the acceleration sensor, and a sound generated due to a facility around a vehicle or another vehicle can be distinguished using the acoustic sensor and the acceleration sensor at the same time.

Furthermore, captured images of the outside of the vehicle and the surroundings of the vehicle for a specific time before and after a point of time at which a determined minor impact is generated in a vehicle can be recorded or stored in the memory of the image capturing device of the vehicle.

Furthermore, an image related to a minor impact generated in a vehicle can be provided to a previously registered web server or a user terminal, such as a smartphone carried by a user. Notification providing notification that an impact was generated in the vehicle of a user can be provided to a user terminal.

Although the present invention has been described in connection with the limited embodiments and the drawings, the present invention is not limited to the embodiments. A person having ordinary skill in the art to which the present invention pertains can substitute, modify, and change the present invention without departing from the technological spirit of the present invention from the description.

Accordingly, the range of right of the present invention should not be limited to the aforementioned embodiments, but should be defined by the claims and equivalent thereof.

What is claimed is:

1. A method for providing a notification of an impact generated on a vehicle of user, performed by an apparatus for sensing the impact on the vehicle, the apparatus including a camera installed in or on the vehicle, comprising:
   detecting the impact generated on the vehicle of the user, wherein the detecting comprises detecting a first type of impact and a second type of impact, and the first type of impact is relatively stronger than the second type of impact, separately;
   generating an impact image captured in response to the detected impact, wherein the generating comprises generating a first impact image in response to the detection of the first type of impact and generating a second impact image in response to the detection of the second type of impact;
   storing the first impact image and the second impact image in an internal storage of the apparatus, the first impact image being stored in a first portion of the internal storage and the second impact image being stored in a second portion of the internal storage; and
   transmitting the generated and stored second impact image to a server operating in conjunction with the apparatus,
   wherein the first impact image is a video which the camera installed in or on the vehicle captures outside of the vehicle and surroundings of the vehicle for a predetermined time period before and after a point of time at which the first type of impact is generated on the vehicle, and the second impact image is a video which the camera installed in or on the vehicle captures outside of the vehicle and surroundings of the vehicle for the predetermined time period before and after a point of time at which the second type of impact is generated on the vehicle,
   wherein the step of generating the second impact image comprises
   compressing the second impact image among videos captured by the camera with a first predetermined compression ratio for transmitting to the server,
   wherein the step of generating the first impact image comprises
   compressing the first impact image with a second predetermined compression ratio corresponding to a higher quality than that of the first predetermined compression ratio,
   wherein the apparatus is associated with and connected to the server such that the notification of the second type of impact and the compressed second impact image are provided to a remotely located user terminal of the user via the server,
   wherein the step of transmitting comprises
   only transmitting the compressed second impact image among the videos captured by the apparatus to the server for providing the second impact image to the user terminal, and
   wherein, via the server, the notification for the generation of the second type of impact is notified to the user terminal such that the user terminal displays a message including information including texts indicative of the generation of the second type of impact as a first portion of the message and a user interface for downloading the second impact image as a second portion of the message, and the second impact image is downloaded into the user terminal in response to the user interface included in the text message being selected by the user.

2. The method of claim 1, wherein the server operating in conjunction with the apparatus is connected to a network which has been registered in the apparatus in advance.

3. The method of claim 1, wherein the apparatus has been registered in the server.

4. The method of claim 1, wherein the information indicative of the generation of the impact includes a plate number of the vehicle.

5. A method for providing a notification of an impact generated on a vehicle of user, performed by a server operating in conjunction with an apparatus for sensing the impact on the vehicle, the apparatus including a camera installed in or on the vehicle,
   the apparatus configured to detect a first type of impact and a second type of impact, separately, the first type of impact being relatively stronger than the second type of impact, to generate a first impact image in response to the detection of the first type of impact and to generate a second impact image in response to the detection of the second type of impact, and to store the first impact image and the second impact image in an internal storage of the apparatus, the first impact image being stored in a first portion of the internal storage and the second impact image being stored in a second portion of the internal storage,
   the method comprising:
   only receiving, among videos captured by the camera installed in or on the vehicle from the apparatus, a video being the second impact image which the camera installed in or on the vehicle captures outside of the vehicle and surroundings of the vehicle for a predetermined time period before and after a point of time at which the impact is generated on the vehicle, the received second impact image being a compressed second impact image compressed with a first predetermined compression ratio by the apparatus while the first impact image is compressed by the apparatus with a second predetermined compression ratio corresponding to a higher quality than that of the first predetermined compression ratio;
   providing a notification for the generation of the second type of impact to a remotely located user terminal of the user, the notification including a message including information including texts indicative of the generation of the second type of impact as a first portion of the message and a user interface for downloading the second impact image as a second portion of the message; and
   transmitting the second impact image to the remotely located user terminal in response to receiving, from the remotely located user terminal, a request for downloading the second impact image, the request being generated in the user terminal in response to the user interface included in the text message being selected by the user.

6. The method of claim 5, wherein account information of the user has been registered in the server.

7. The method of claim 5, wherein the apparatus has been registered in the server.

8. The method of claim 5, wherein the server is connected to a network which has been registered in the apparatus in advance.

9. An apparatus for sensing an impact on a vehicle, comprising:
- a camera installed in or on the vehicle;
- an impact detection sensor configured to detect the impact generated on the vehicle of the user, wherein a first type of impact and a second type of impact are detected separately based on a detection of the impact detection sensor, and the first type of impact is relatively stronger than the second type of impact;
- an image processing unit configured to generate an impact image captured by the camera in relation to the impact, wherein the image processing unit is configured to generate a first impact image in response to the detection of the first type of impact and to generate a second impact image in response to the detection of the second type of impact;
- an internal storage configured to store the first impact image in a first portion of the internal storage and to store the second impact image in a second portion of the internal storage; and
- a communication module configured to transmit the generated and stored second impact image to a server operating in conjunction with the apparatus,
- wherein the first impact image is a video which the camera installed in or on the vehicle captures outside of the vehicle and surroundings of the vehicle for a predetermined time period before and after a point of time at which the first type of impact is generated on the vehicle, and the second impact image is a video which the camera installed in or on the vehicle captures outside of the vehicle and surroundings of the vehicle for the predetermined time period before and after a point of time at which the second type of impact is generated on the vehicle,
- wherein the image processing unit is configured to compress the second impact image among videos captured by the camera with a first predetermined compression ratio for transmitting to the server,
- wherein the image processing unit is configured to compress the first impact image with a second predetermined compression ratio corresponding to a higher quality than that of the first predetermined compression ratio,
- wherein the apparatus is associated with and connected to the server and a notification of the second type of impact and the compressed second impact image are provided to a remotely located user terminal of the user via the server,
- wherein the communication module is configured to
- only transmit the compressed second impact image among the videos captured by the apparatus to the server for providing the second impact image to the remotely located user terminal, and
- wherein, via the server, the notification for the generation of the second type of impact is notified to the remotely located user terminal, wherein the remotely located user terminal displays a message including information including texts indicative of the generation of the second type of impact as a first portion of the message and a user interface for downloading the second impact image as a second portion of the message, and the second impact image is downloaded into the user terminal in response to the user interface included in the message being selected by the user.

10. The apparatus of claim 9, wherein the server operating in conjunction with the apparatus is connected to a network which has been registered in the apparatus in advance.

11. The apparatus of claim 9, wherein the apparatus has been registered in the server.

* * * * *